Feb. 23, 1954
G. S. RYDZEWSKI
2,669,785
SOUNDING DEVICE FOR LOCATING SHALLOWS
AND HOLES IN A LAKE BOTTOM
Filed Aug. 9, 1948
3 Sheets-Sheet 1
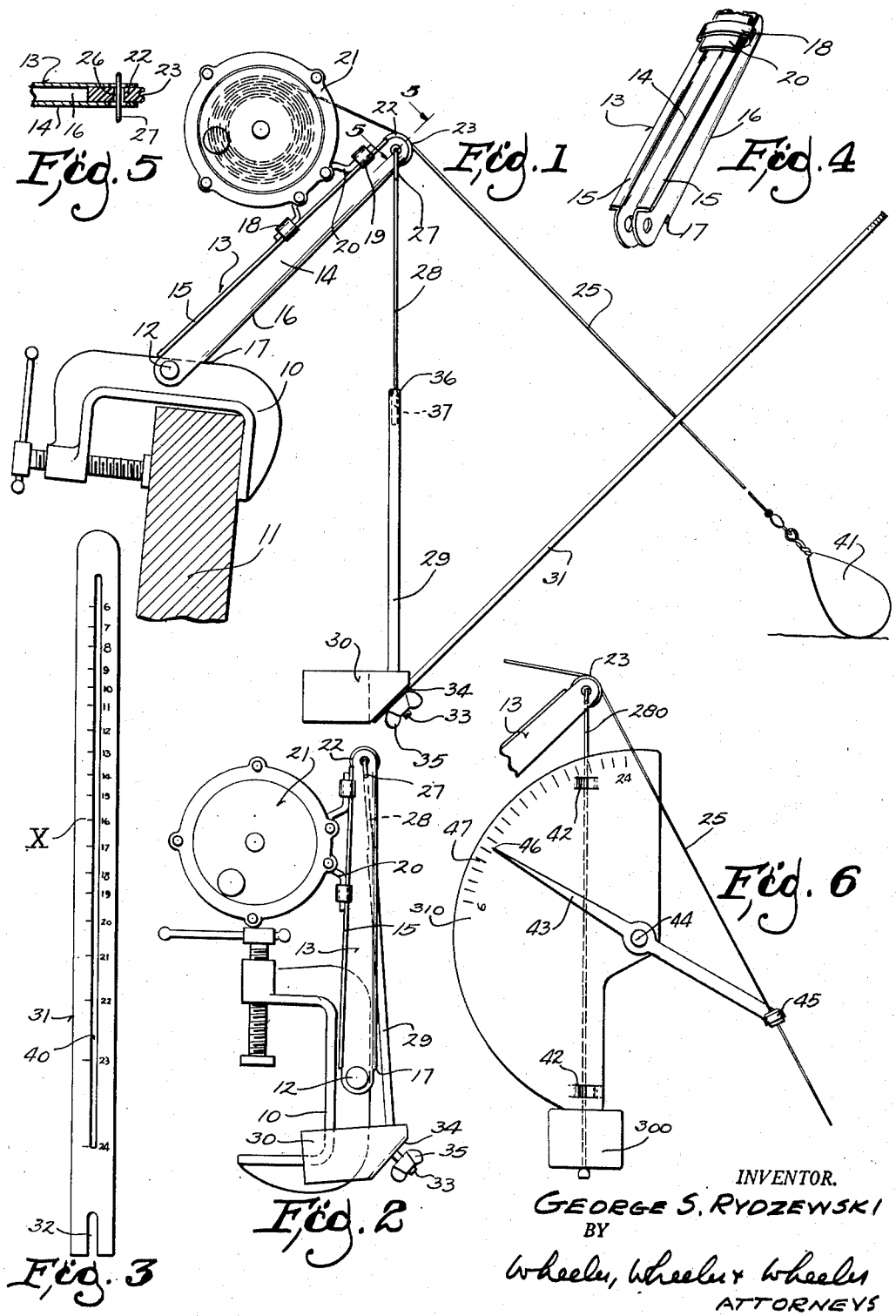
INVENTOR.
GEORGE S. RYDZEWSKI
BY
Wheeler, Wheeler & Wheeler
ATTORNEYS

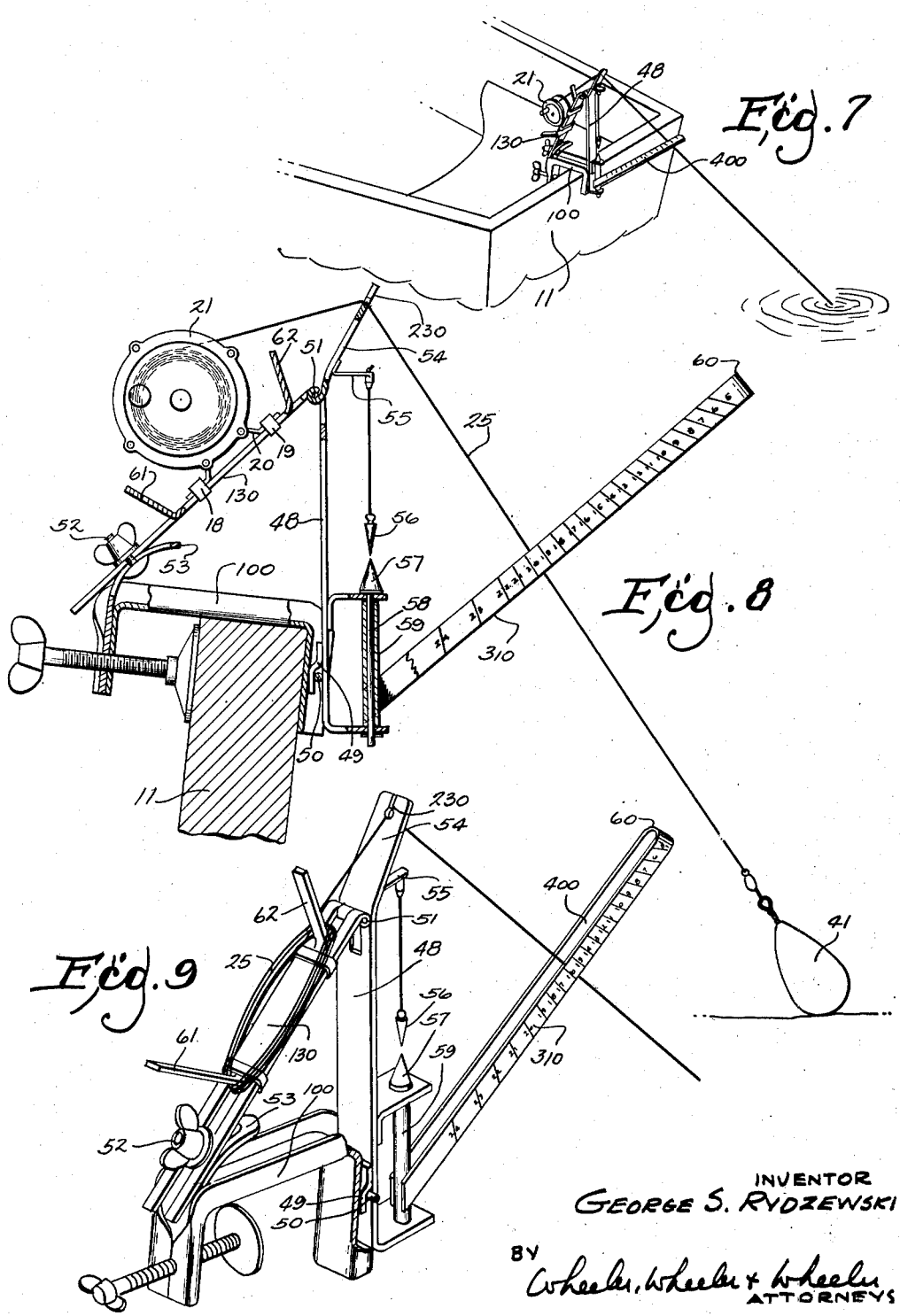

Feb. 23, 1954
G. S. RYDZEWSKI
2,669,785
SOUNDING DEVICE FOR LOCATING SHALLOWS
AND HOLES IN A LAKE BOTTOM
Filed Aug. 9, 1948
3 Sheets-Sheet 3
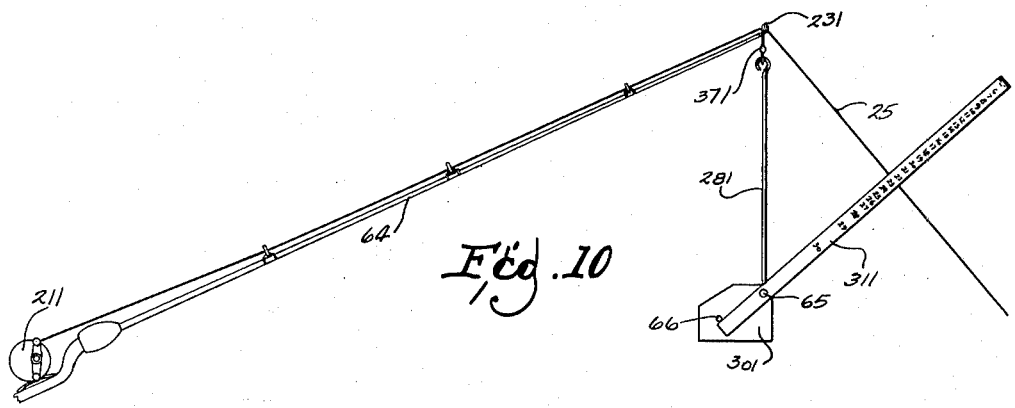
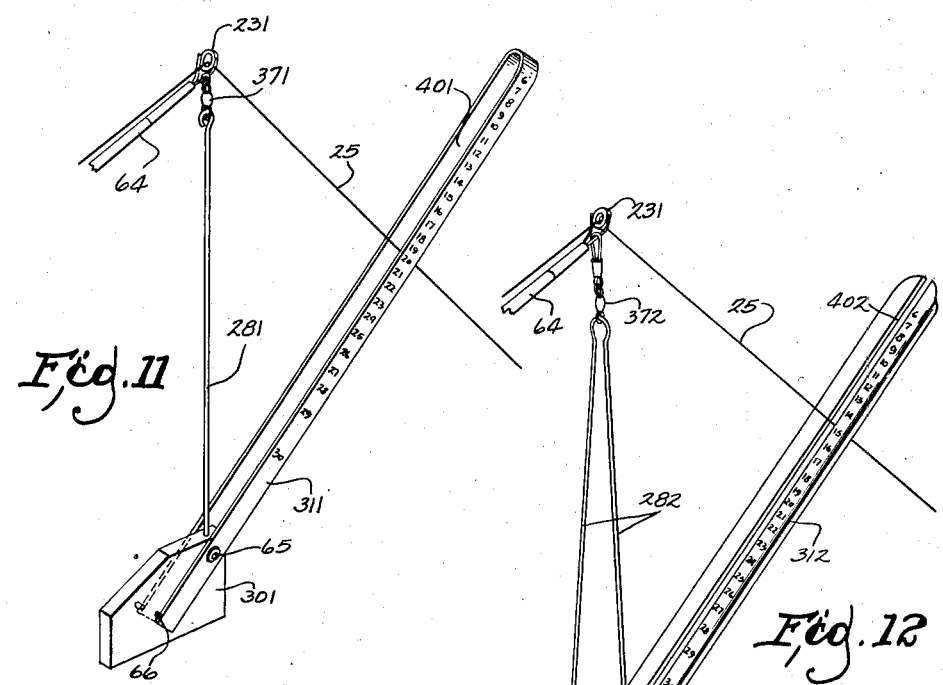
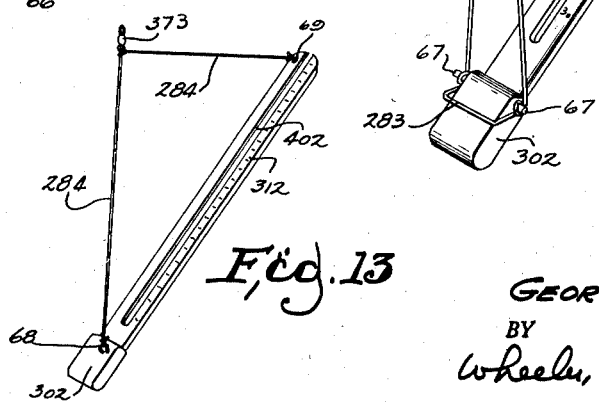
INVENTOR.
GEORGE S. RYDZEWSKI
BY
Wheeler, Wheeler & Wheeler
ATTORNEYS Patented Feb. 23, 1954

2,669,785

UNITED STATES PATENT OFFICE 2,669,785

SOUNDING DEVICE FOR LOCATING SHALLOWS AND HOLES IN A LAKE BOTTOM

George S. Rydzewski, Milwaukee, Wis.

Application August 9, 1948, Serial No. 43,239

12 Claims. (Cl. 33—126.5)

This invention relates to a sounding device for locating shallows and holes in a lake bottom.

It is a primary object of the invention to provide a simple and inexpensive means for enabling a fisherman to locate the most advantageous place to fish. However, the device has other utility and, with simple modifications as hereinafter explained, it is adapted to function in water of practically any moderate depth.

More specifically it is a primary object of the invention to provide means which will function accurately regardless of the loading or erratic movement of the boat with which it is used; and to provide a device which is preferably self-adjusting to the upright position in which it is adapted for use.

It is a further important object of the invention to provide a device which, in its preferred embodiment, uses the line itself as an indicator or pointer movable across a scale which, with reference to the angularity assumed by the line at the moment, is calibrated to give a direct reading of the depth of the water in feet.

Other objects of the invention will appear from the following disclosure thereof in which Fig. 1 is a view in side elevation showing a device embodying the invention as applied to the transom of a boat which is illustrated in section.

Fig. 2 is a view in side elevation showing the device as it appears when collapsed for storage.

Fig. 3 is a plan view of the calibrated scale arm as it appears detached from the collapsed device shown in Fig. 2.

Fig. 4 is a fragmentary detail view in perspective showing the end of the reel mounting arm.

Fig. 5 is a fragmentary detail view taken on the line 5—5 of Fig. 1.

Fig. 6 is a fragmentary side elevation showing a modified embodiment of the invention.

Fig. 7 is a view in perspective showing a further modified embodiment of the invention.

Fig. 8 is an enlarged fragmentary detail view largely in side elevation but partially in section vertically through the device of Fig. 7.

Fig. 9 is a view on an enlarged scale showing in perspective a further modified embodiment of the invention.

Fig. 10 is a view in side elevation of a modified embodiment of the invention used in connection with a casting rod which provides support therefor.

Fig. 11 is a fragmentary detail view in perspective on an enlarged scale showing the embodiment of Fig. 10 as it appears suspended from the end of a casting rod or other suitable support.

Fig. 12 is a view in perspective showing a further slightly modified embodiment of the invention.

Fig. 13 is a view similar to Fig. 12 showing on a reduced scale a further modification.

The embodiment shown in Fig. 1 comprises a substantially conventional C-clamp 10 which is attached to the gunwale 11 or other convenient point on the boat used in taking the soundings.

Pivoted by means of pintle bolt 12 to the clamp 10 is a reel mounting arm 13 which comprises a channel 14 having laterally projecting flanges 15 and a bottom web 16 which terminates short of the end of the channel to provide a shoulder at 17 engageable with the clamp 10 as a stop to limit the pivotal movement of arm 13 at an angle at which the arm projects upwardly and rearwardly as shown in Fig. 1. The sides of the channel project rearwardly beyond the shoulder 17 to provide ears with which the pintle bolt 12 is engaged, the detail of these ears being best shown in Fig. 4.

Slidably mounted upon the outwardly turned flanges 15 are the clamping clips 18, 19, these being used to anchor the base 20 of a conventional reel 21 on arm 13.

At the end of arm 13, I provide an insert 22 in the channel 14, such insert preferably projecting beyond the channel and having a rounded and grooved extremity 23 for guiding the line 25 drawn from the reel. The insert has a transverse bore at 26 aligned with openings in the channel to receive the eye 27 of a supporting wire or rod 28 which serves as a link for the suspension of a gauge unit which comprises a bar 29, weight 30 and gauge arm 31. The gauge arm has a terminal slot at 32 which receives a bolt 33 projecting downwardly from the beveled surface 34 of weight 30. A wing nut 35 threaded to this bolt clamps the lower end of arm 31 to the surface 34 to hold the arm at precisely the correct upward inclination. The bar 29 is preferably tubular and constricted at 36 for engagement with the head 37 on link 28, thereby permitting the link 28 to be collapsed within the tubular bar 29 when the apparatus is to be stored. For storage purposes, the reel mounting arm 13 collapses upon the pintle bolt 12 of clamp 10 to the position shown in Fig. 2 and the weight 30, preferably having the shape of a horseshoe, receives a portion of the clamp 10 to nest securely thereabout in a position permitted by the collapse of the link 28 within groove 29.

When the device is in use, the weight 30 is biased by gravity to assume a position in which the gauge arm 31 is at precisely the correct angle for which its calibrations are determined. The calibrations also are based upon a predetermined length of line 25 which may, for example, be twenty-four feet. The arm 31 has at 40 an elongated slot through which the line 25 extends, the line 25 preferably including at its extreme end a sinker 41.

When the boat is operated by oars, or by drifting before the wind, or otherwise to drag the weight 41 upon the bottom of the waterway, the angle of the line 25 with respect to the calibrations on the arm 31 will automatically indicate in feet the depth of the waterway. Thus, with the line assuming the angle indicated in Fig. 1, it will pass through the slot 40 in the gauge arm 31 approximately at the point indicated at $x$ in Fig. 3, and the operator will know, from the accompanying calibration opposite the position of the line, that the water above the weight or sinker 41 has a depth of about sixteen feet.

If the line hangs vertically downwardly through the bottom of the slot 40, and is twenty-four feet in length from the guide, the depth of water will obviously be twenty-four feet or more (minus the height of the guide above water level, the calibrations being marked to allow for this discrepancy). So long as the linkage 28, 29 is vertical, or at least while the arm 31 is held at the angle for which it is designed, there will be a constant relationship between the angle of the line and the calibrations on the arm so that the line itself will serve as a pointer giving a direct reading of depth.

It is further to be noted that the connection between the ball or head 37 of link 28 and the constructed end 36 of the tube 29 serves as a swivel permitting the entire gauge unit to pivot on a vertical axis to compensate automatically for drift. In other words, the device automatically assumes a position in which the arm 31 is in the correct angle in a vertical plane which includes the shortest distance between the sinker 41 and the reel 21.

In the modification shown in Fig. 6, the arm 13 for the support of reel 21 is identical with that already described. The link 280 is suspended in the same manner from the upper end thereof and is gravity biased by the weight 300 to the correct position for which the calibrated dial 310 has been calibrated. The disk may conveniently be mounted on the link 280 by offsetting a pair of straps 42 to provide eyes through which the link 280 extends behind plate 310.

A pointer 43 is pivoted to the calibrated plate 310 on a pintle 44. At its outer end, the pointer 43 is provided with an eye at 45 through which the line is threaded. The tension on the line keeps it taut between guide 23 and the sinker at the bottom of the lake, and so controls the position of the pointer according to the angle of the line that the tip 46 of the pointer will properly coact with the calibrated scale 47 on plate 310 to indicate at all times the exact depth of the water.

In the devices shown in Figs. 7 and 8, it is necessary to pre-set the apparatus manually to the exact loading of the craft on which the device is mounted. The C-clamp 100 is attached to the boat transom 11 in the manner above described. Detachably mounted thereon is an upright member at 48 which has a finger 49 engaged behind a pin 50 carried by the clamp. Pivoted to the top of the member 48 on a pintle 51 is a reel supporting arm 130 which is adjustably connected by a bolt and wing nut at 52 with an arm 53 fixed to the clamp 100. The reel 21 is mounted on the arm 130 substantially in the manner already described and the line 25 runs through a guide slot 230 in the offset upper end portion 54 of the upright 48.

For the assistance of the operator in setting the device to a vertical position, I provide a short bracket arm at 55 supporting a plumb bob 56 which can be set to register with an indicating point 57 at the top of a pintle rod 58 upon which the gauge arm 310 is swiveled, preferably by means of a bushing at 59. The gauge arm preferably comprises a single strap bent upon itself at its outer end at 60, the ends extending thence in parallelism and connected to opposite sides of the bushing 59. The space between the two sides of the strap comprising arm 319 constitutes a slot at 400 through which the line 25 extends and the calibrations on one or both sides of the arm 310 give a reading directly opposite the line itself to indicate accurately the depth of the water over the sinker 41.

The reel mounting arm 130 is desirably provided with integral upwardly struck fingers at 61 and 62 upon which the line may be wound if a reel is not used. Accordingly, the device of Fig. 9 differs from that of Fig. 8 only in that the line is wound about the fingers 61, 62 instead of being wound upon a reel.

Fig. 10 and Fig. 11 show a modified embodiment of the invention and also illustrate the fact that an ordinary casting rod may be used to provide support. Such a rod is shown at 64, but it is to be understood that there is nothing about the embodiment shown in Figs. 10 and 11 which requires that it be used exclusively with a casting rod. A swivel coupling such as is frequently used to connect a fishing bait to a line may be employed at 371 for connection with the guide fitting 231 at the end of the rod to support the link 281 whereby weight 301 is suspended. Pivoted to the weight upon pintle 65 is the slotted scale arm 311 suitably calibrated with indications of depth, the line 25 extending from the guide 231 at the end of the rod through the slot 401 of the scale arm for direct indication, with reference to the calibrations, of the depth of the water according to the angle of the line.

In order that the device may be accurate while in use, and may nevertheless be collapsed for storage, the pivotal movement of the calibrated arm 311 with respect to the weight is limited by one or more stops 66 which define its operative position. For storage, the arm may be swung upwardly to embrace the link 281.

In the arrangement shown in Fig. 12, a similar swivel connector is used at 372 to support a bifurcated link 282 which is engaged with the pins 67 for pivotal connection with the weight 302. In this instance, the weight moves bodily with the calibrated arm 312 to an operative position which is limited by the yoke portion 283 of the suspension link 282. In use, the line 25 extends through the slot 402 which, for the purposes of this disclosure, may be open at the top to facilitate the introduction and removal of the line. For storage, the arm 312 folds up against the bifurcated suspending link 282.

In the construction shown in Fig. 13, the suspension link comprises a piece of cord or line 284 carried from the swivel connector 373. The weight 302 and the arm 312 are unitary, exactly as in the construction of Fig. 12. The proper positioning of the parts is assured by the connection of the part 284 to an eye 68 which is at one side of the weight and at one side of the slot 402 and an eye 69 which is at a remote point of the arm and to the other side of the slot in the arm and also securing it at an intermediate point of the connector 373 so that the suspended unit comprising the weight and the arm will always hang at a predetermined angle, leaving the slot 402 open to receive the line which, according to its angle will afford a reading of the depth of the water by its position with reference to the calibrated scale carried by the arm. This device is collapsible for transportation because of the fact that the suspending cord 284 is entirely flexible and, when relieved of weight, collapses against the arm. All of the devices shown on sheet 3 of the drawings are of the pendulum type and each is especially designed to collapse into small space for transportation, while nevertheless providing for a predetermined angle of the calibrated arm in order that the reading of the line against the calibrations may be correct. It is understood, in each instance, that the particular calibrations may be varied according to the predetermined length of line employed.

In all forms of my invention, the device automatically allows for drift, the gauge arm automatically accommodating itself, under tension of the line, to the plane in which the line is disposed. However, in the device shown in Figs. 7 to 9, there is no automatic compensation for variations in boat loading or for changes in boat angle resulting from waves.

In all forms of the invention, it will be apparent that where the average depth of water is greater or less than that for which the device is shown, the device is readily adapted either by recalibrating the gauge arm or by applying thereto a multiplying factor which is proportioned to the change in length of the line and which may be either a multiple thereof or a fraction thereof. For example, if forty-eight feet of line is payed out, the depth figures on the gauge arm would have to be correspondingly multiplied by two. If three times the line is payed out, the depth figures would be multiplied by three. If half the line is payed out, the depth figures would be divided by two.

Since it is well known that certain fish are to be found at certain times on shoals and at other times in holes, the device herein disclosed enables a fisherman to carry a device which is readily collapsible for transportation in his tackle box and readily set up for use to enable the fisherman accurately to chart the depth and shallows.

I claim:

1. A sounding device adapted to indicate the depth of a body of water over the bottom of which a weight is dragged at the end of a line of predetermined length, said device comprising the combination with said line and weight, of a depth indicator comprising a pendulum including a support, a weight and an arm upwardly oblique respecting the support, said arm being provided with a scale calibrated in a fixed relationship to the length of the line and means along said scale for the guidance of the line as the weight is dragged over the bottom whereby the line indicates directly on the scale the depth of the weight beneath the surface of the water, the combined weight of the arm and weight coacting to hold said pendulum on a line of plumb whereby the arm is held at a fixed angle to the line of plumb.

2. A device of the character described comprising the combination with a support, of a telescopically collapsible link having portions in swiveled connection, one of said portions having a pendulum connection with said support and the other of said link portions being provided with a weight, together with a slotted arm connected with the weighted portion of said link and extending obliquely upwardly and rearwardly therefrom and provided with calibrations along its slot whereby a weighted line extending rearwardly and downwardly from said support through said slot will directly coact with said calibrations to provide a reading of depth.

3. The device of claim 2 in which said weight is beveled and provided with a clamping bolt, said arm having a portion clamped on said bolt to said weight.

4. The combination set forth in claim 2 in which said support is provided with a line holding means.

5. A device of the character described comprising a pendulum having a support portion and a freely swinging weighted portion suspended from said support and held substantially plumb by force of gravity, a calibrated arm mounted on said weighted portion and extending at an angle to the line of plumb, said arm being provided with a guide slot, and a weighted line extending from said support portion to said slot and coacting directly with the calibrations of said arm to give a reading of depth.

6. The device of claim 5 in which said pendulum comprises a connection with said support on which it may swivel in a horizontal plane.

7. The device of claim 5 in which said swinging portion and said arm are provided with adjustable coupling means whereby the position of the arm with respect to said swinging portion may be adjusted.

8. The device of claim 5 in which said pendulum comprises a flexible suspension member and a weight rigid with said arm, said member being connected to said weight at one side of the slot of said arm and to a remote point on the arm at the other side of said slot.

9. The device of claim 7 in which the coupling comprises a pivot upon which the arm is swingable with respect to said swinging portion.

10. A device of the character described comprising the combination with a support, of a collapsible link having portions in swiveled connection, one of said portions having a pendulum connection with said support, together with a slotted arm and a weight connected with the other of said link portions, said slotted arm extending obliquely upwardly and rearwardly from said connection and provided with calibrations along its slot whereby a weighted line extending rearwardly and downwardly from said support through said slot will directly coact with said calibrations to provide a reading of depth.

11. A device of the character described comprising the combination with a support, of a pendulum having a weight, a member suspending said weight from said support for free swinging movement, a slotted arm and means mounting said arm in a position upwardly oblique with respect to the said member, said arm being disposed at one side of the axis on which the member is disposed and the weight being disposed on the other side of said axis whereby the weight and arm combine to define the center of gravity of the pendulum, said arm being provided with calibrations along its slot and the line having a fixed length, said calibrations being in terms of said fixed length whereby said line directly indicates a reading of depth on said scale.

12. A sounding device comprising the combination with a support and a line of predetermined length provided with a sounding weight at one end and connected to the support at its other end, of a slotted arm having means suspending it from said support and extending obliquely upwardly and rearwardly across the path of said line and provided beside its slot with a scale calibrated in fixed relation to the length of the line to be indicative of depth, said suspending means comprising an upright pivot, said arm being provided with means on which the arm is swiveled for rotation upon said pivot, said line passing through said slot and constituting an indicator coacting directly with the calibrations of said arm for indicating depth and also serving by its tension to maintain the arm in an angular position of adjustment respecting said pivot means to lie substantially in a vertical plane in which said line is disposed, said slotted arm and suspending means comprising a pendulum acted on by gravity for automatic bias to a plumb position in which the arm is disposed at a fixed angle with respect to the line of plumb, said pendulum further comprising a weight at the opposite side of the line of plumb from said arm whereby to counterbalance said arm and define with said arm the center of gravity of the pendulum.

GEORGE S. RYDZEWSKI.

References Cited in the file of this patent

UNITED STATES PATENTS

| Number | Name | Date |
|---|---|---|
| 486,782 | Hunter | Nov. 22, 1892 |
| 555,489 | Aubert | Mar. 3, 1896 |
| 751,623 | Farr | Feb. 9, 1904 |
| 1,398,853 | Ginzbourg | Nov. 29, 1921 |

FOREIGN PATENTS

| Number | Country | Date |
|---|---|---|
| 24,347 | Great Britain | Oct. 21, 1897 |
| 4,809 | Great Britain | Mar. 6, 1901 |
| 16,316 | Great Britain | Nov. 19, 1915 |
| 581,258 | France | Apr. 30, 1924 |